(12) United States Patent
Lam et al.

(10) Patent No.: US 7,210,542 B2
(45) Date of Patent: May 1, 2007

(54) POWER TOOL SAFETY DEVICE

(75) Inventors: Hin Ming Lam, Chai Wan (HK); Ka Fai Lai, Tsuen Wan (HK); Ting Yu Kwan, Tsuen Wan (HK)

(73) Assignee: Defond Components Limited, Chai Wan (HK)

( * ) Notice: Subject to any disclaimer, the term of this patent is extended or adjusted under 35 U.S.C. 154(b) by 0 days.

(21) Appl. No.: 10/947,135

(22) Filed: Sep. 23, 2004

(65) Prior Publication Data

US 2006/0060364 A1    Mar. 23, 2006

(51) Int. Cl.
*B23B 45/02* (2006.01)
*H01H 9/00* (2006.01)
(52) U.S. Cl. .................. 173/217; 173/171; 200/1 V
(58) Field of Classification Search .................. 173/47, 173/48, 170, 171, 217; 200/1 V, 17 R, 522, 200/50, 32
See application file for complete search history.

(56) References Cited

U.S. PATENT DOCUMENTS

| | | | | |
|---|---|---|---|---|
| 3,467,801 | A * | 9/1969 | Matthews | 200/1 V |
| 4,097,704 | A * | 6/1978 | Piber | 307/126 |
| 4,100,383 | A * | 7/1978 | Piber | 307/126 |
| 4,204,580 | A * | 5/1980 | Nalley | 173/48 |
| 4,277,661 | A * | 7/1981 | Riess | 200/522 |
| 5,346,342 | A * | 9/1994 | Winchester | 409/134 |
| 6,199,642 | B1 * | 3/2001 | Becker et al. | 173/217 |
| 6,489,578 | B1 * | 12/2002 | Jung et al. | 200/332.2 |

* cited by examiner

*Primary Examiner*—Stephen F. Gerrity
*Assistant Examiner*—Paul Durand
(74) *Attorney, Agent, or Firm*—Leydig, Voit & Mayer, Ltd.

(57) ABSTRACT

A safety device for a power tool having an electric motor and a trigger to activate the motor via a primary trigger-activated switch, includes an auxiliary switch in circuit with the motor, an activator movable between a first position in which the auxiliary switch is opened by the activator and the activator prevents depression of the trigger, and a second position in which the auxiliary switch is closed by the activator and the activator allows depression of the trigger.

5 Claims, 5 Drawing Sheets

POWER TOOL SAFETY DEVICE

The present invention relates to a power tool safety device.

BACKGROUND OF THE INVENTION

More particularly, although not exclusively, the invention provides a safety switch for a power tool that physically prevents depression of the tool's trigger and simultaneously provides a secondary electrical switch in series with a primary electrical trigger switch.

Known power tools such as hand-held drills, saws and sanders for example have a trigger that is activated by the user to close an electrical circuit to the tool's motor relay. Some tools include a motor-reversing switch and some comprise a mechanical safety catch to prevent inadvertent depression of the trigger. If such a mechanical safety catch were to fail or wear out, the trigger might still be depressed inadvertently to close an electrical circuit and unwittingly activate the tool's motor.

OBJECTS OF THE INVENTION

It is an object of the present invention to overcome or substantially ameliorate the above disadvantage and/or more generally to provide an improved power tool safety device.

SUMMARY OF THE INVENTION

There is disclosed herein a safety device for a power tool having an electric motor and a trigger to activate the motor via a primary trigger-activated switch, comprising:
an auxiliary switch in circuit with the motor,
an activator movable between a first position in which the auxiliary switch is opened by the activator and the activator prevents depression of the trigger, and a second position in which the auxiliary switch is closed by the activator and the activator allows depression of the trigger.

Preferably, the activator comprises a stopper against which the trigger abuts in the first position.

Preferably, the activator is movable to a third position in which the auxiliary switch is closed by the activator and the activator allows depression of the trigger, and wherein the first position is located between the second and third positions.

Preferably, the activator is mounted pivotally upon a shaft.

Preferably, the auxiliary switch comprises a conductive contact plate pivoting with the shaft and having a non-conductive region or gap, and a pair of fixed contact points bearing upon the contact plate to close the auxiliary switch, whereupon pivoting of the contact plate to align the non-conductive region or gap with one of the fixed contact points, the auxiliary switch is opened.

Preferably, the safety device further comprises a resistance pin cooperating with the activator to maintain the activator in the first, second or third positions, until a threshold force is applied to the activator.

Preferably, the safety device further comprises a spring to bias the activator toward the first position.

BRIEF DESCRIPTION OF DRAWINGS

Preferred forms of the present invention will now be described by way of example with reference to the accompanying drawings, wherein.

DETAILED DESCRIPTION OF PREFERRED EMBODIMENT

Figure 1:
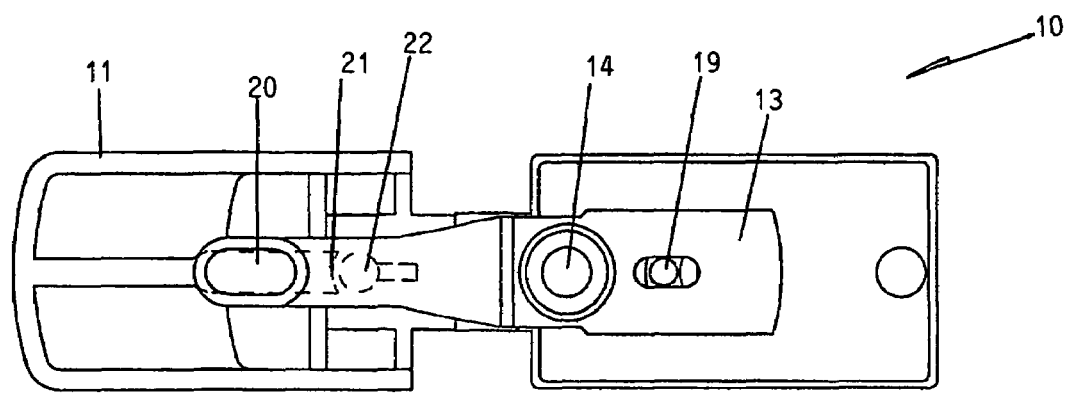
FIG. 1 is a schematic plan view of a power tool safety device in a trigger-locked (first) configuration.

In the accompanying drawings there is depicted schematically a safety device embodying the invention for a handheld power tool comprising a switch box 10 to which there is mounted a trigger 11 upon a plunger 12. The plunger 12 activates a primary electrical switch or trigger switch 29.

The switch box 10 is typically formed of moulded plastics material, and so are the trigger 11 and plunger 12.

Behind the trigger 11 and at the top region of the switch box 10, there is provided an auxiliary switch 26 and an auxiliary switch activator 13. The auxiliary switch activator 13 is fixed upon a shaft 14 and includes a stopper 22 depending therefrom. The stopper 22 is in the form of a fixed pin that can bear against an abutment 21 formed inside the trigger 11.

Figure 2:
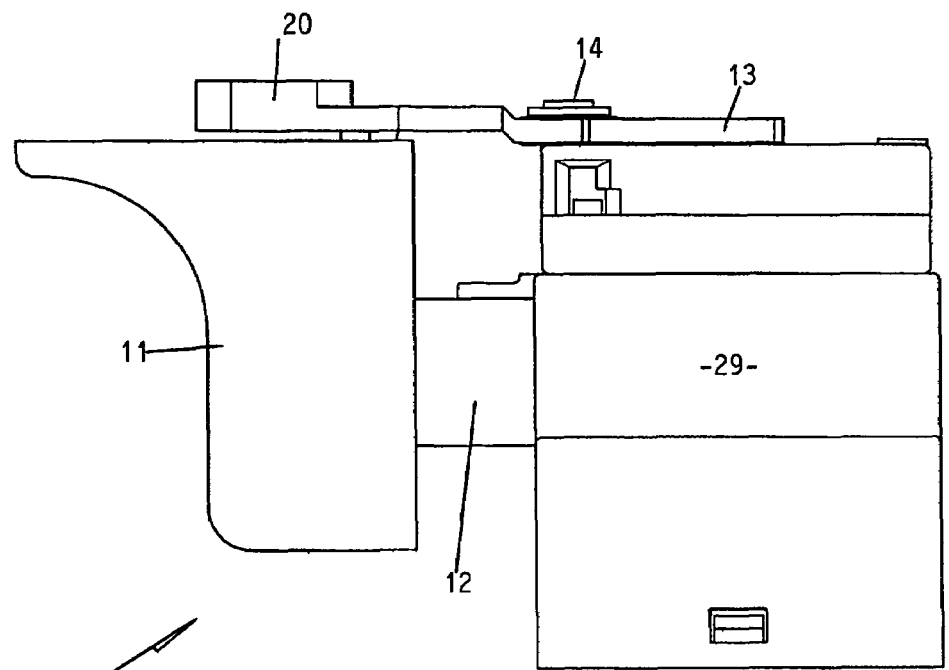
FIG. 2 is a schematic elevation of the safety device in the first configuration.
Figure 3:
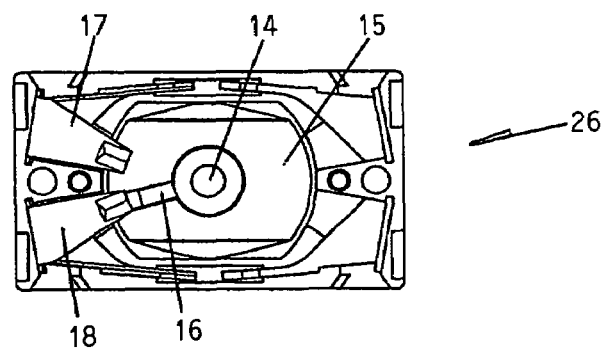
FIG. 3 is a schematic plan view of an auxiliary switch in the first (circuit open) configuration.

The auxiliary switch activator 13 includes a pushing surface 20 that can be pushed either left or right (transverse to the direction of movement of the trigger 11 and plunger 12) by means not shown. In the centre position as depicted in FIGS. 1 to 3, the stopper 22 is aligned with the abutment 21 so that the trigger 11 cannot be depressed.

Attached to the shaft 14 is an electrically conductive contact plate 15. The contact plate 15 moves with the shaft 14 upon pivotal movement of the switch activator 13. The contact plate 15 includes a radial slot 16 (or a strip of non-conductive, or dielectric material) radiating from the shaft 14. Fixed within the switch box 10 is a pair of contact points 17 and 18 that can each bear upon the contact plate 15. In the configuration depicted in FIG. 3, contact points 17 and 18 are electrically disconnected from one another because the contact point 18 is aligned with the slot 16 and does not connect electrically with the contact plate 15.

Figure 4:
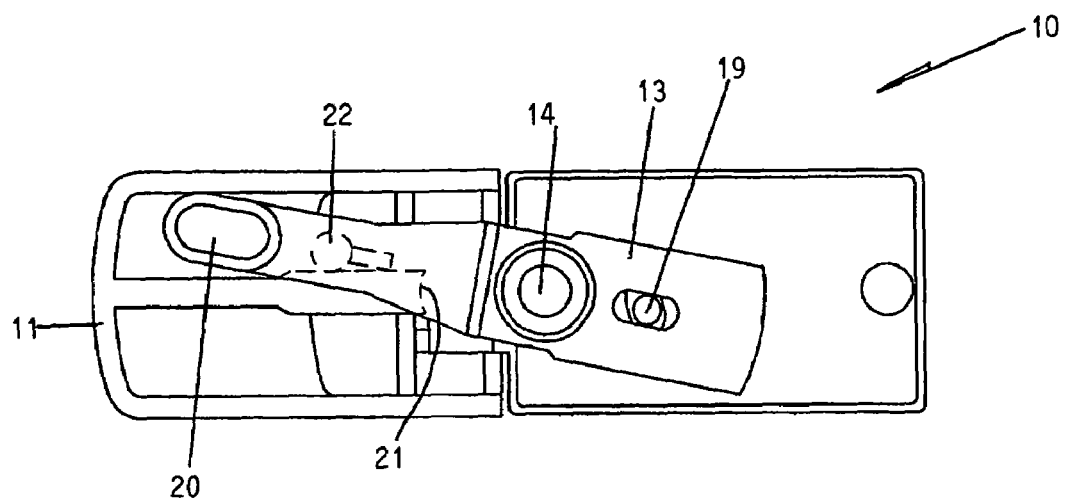
FIG. 4 is a schematic plan view of a power tool safety device in a trigger-unlocked (second) configuration.
Figure 5:
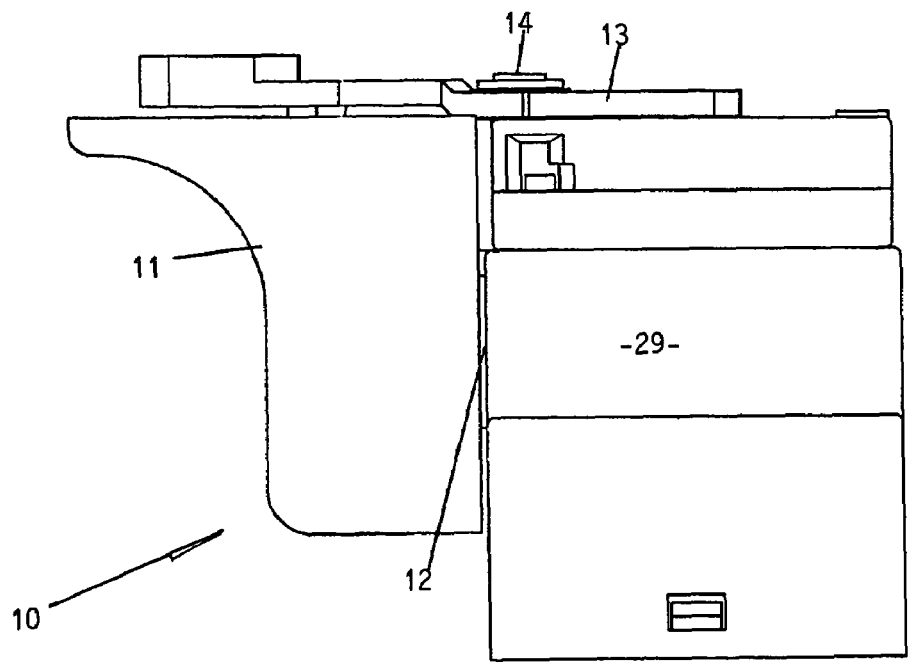
FIG. 5 is a schematic elevation of the safety device in the second configuration.
Figure 6:
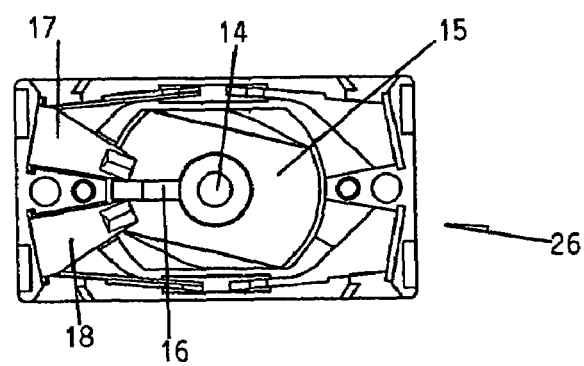
FIG. 6 is a schematic plan view of an auxiliary switch in the second (circuit closed) configuration.

In the position of the switch activator 13 depicted in FIG. 4 (second position), the stopper 22 is laterally displaced to one side of the abutment 21 and therefore the trigger 11 can be depressed so that the plunger 12 closes the primary electrical switch 29. In this configuration, and as shown in FIG. 6, both contact points 17 and 18 are engaged upon the contact plate 15. The auxiliary switch 26 is therefore closed.

Figure 7:
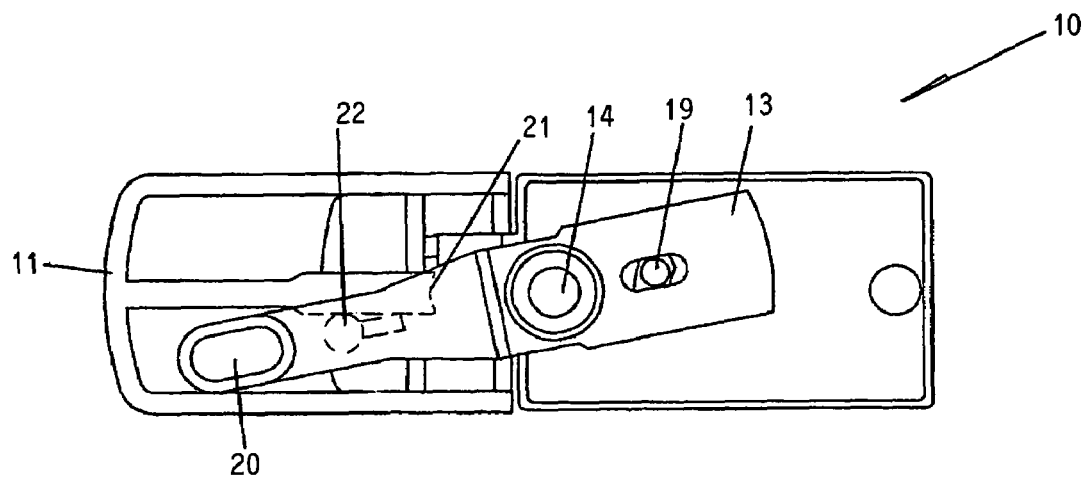
FIG. 7 is a schematic plan view of a power tool safety device in a trigger-unlocked (third) configuration.
Figure 8:
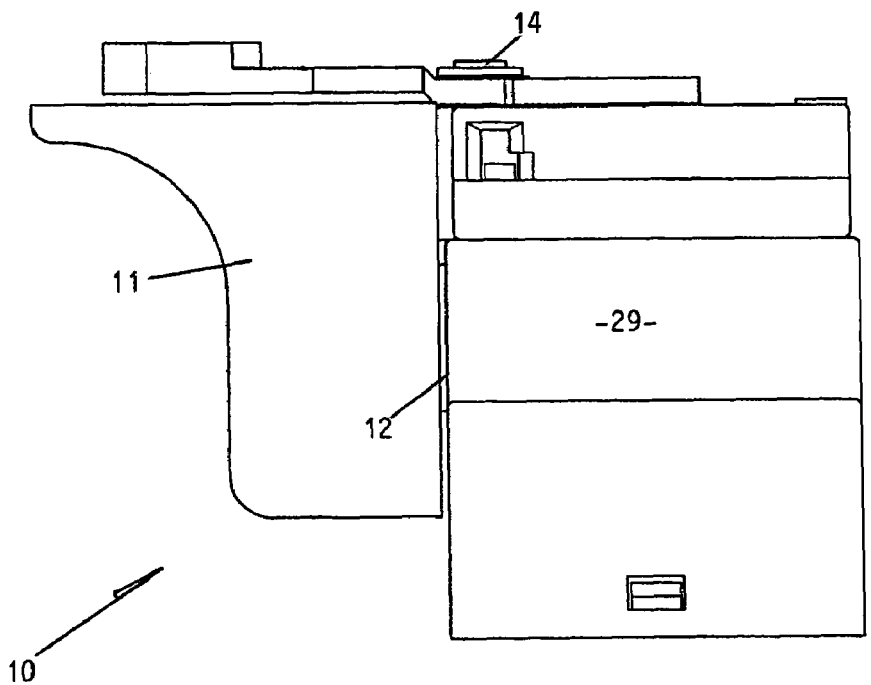
FIG. 8 is a schematic elevation of the safety device in the third configuration.
Figure 9:
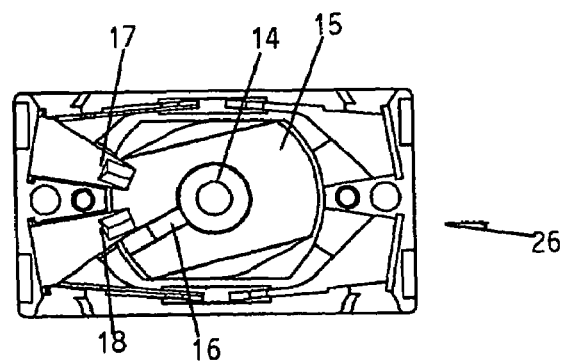
FIG. 9 is a schematic plan view of an auxiliary switch in the third (circuit closed) configuration.

In the position of the switch activator 13 depicted in FIG. 7 (third position), the stopper 22 is laterally displaced to the other side of the abutment 21 and therefore the trigger 11 can be depressed so that the plunger 12 closes the primary electrical switch 29. In this configuration, and as shown in FIG. 9, both contact points 17 and 18 are engaged upon the contact plate 15. The auxiliary switch 26 is therefore closed.

Figure 10:
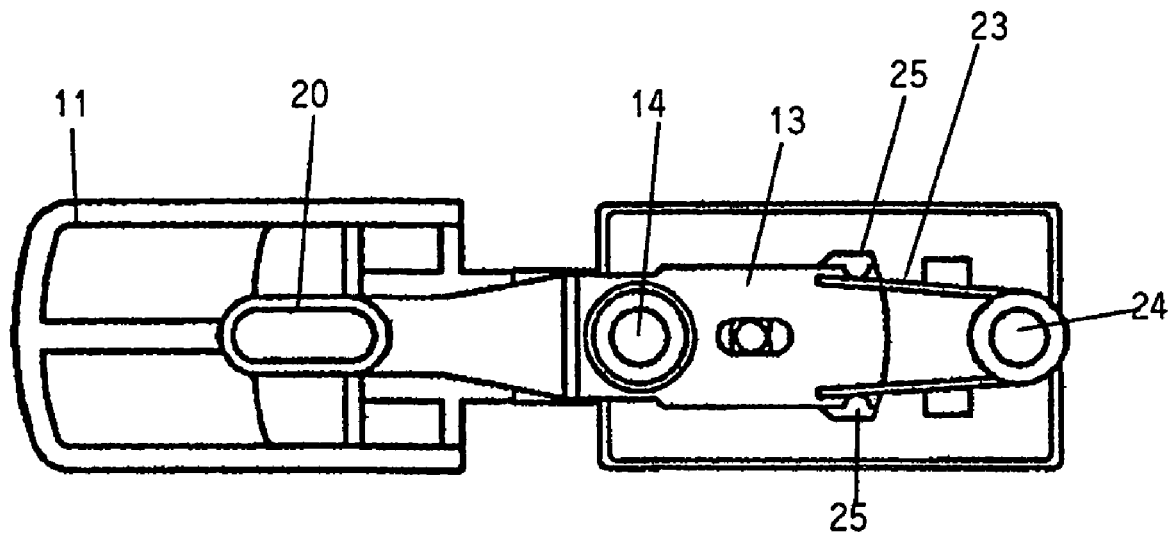
FIG. 10 is a schematic plan view of an alternative power tool safety device in a trigger-locked (first) configuration.
Figure 11:
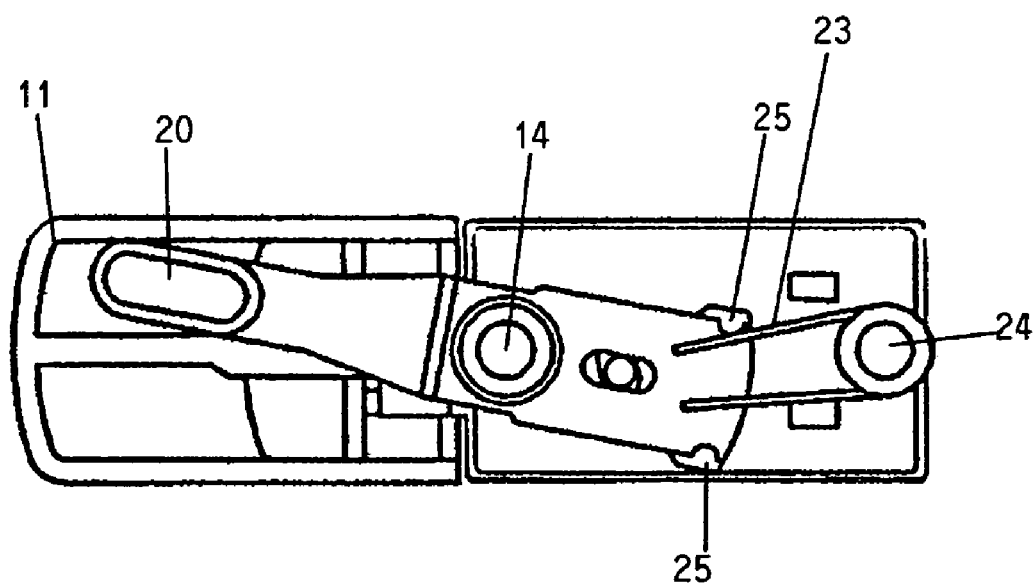
FIG. 11 is a schematic plan view of a power tool safety device of FIG. 10 in a trigger-unlocked (second) configuration.

The auxiliary switch activator 13 includes a slot into which a resistance pin 19 extends. This pin 19 serves to maintain the position of the activator 13 in one of the three positions depicted until a threshold force is applied in either direction to the pushing surface 20. In the embodiment depicted in FIGS. 10 and 11, there is a leaf spring 23 mounted upon a spring post 24 and having a pair of legs each pressing against respective pin bearings 25 upon the activator 13. These serve to bias the activator 13 into the first position at which the trigger 11 cannot be depressed.

Figure 12:
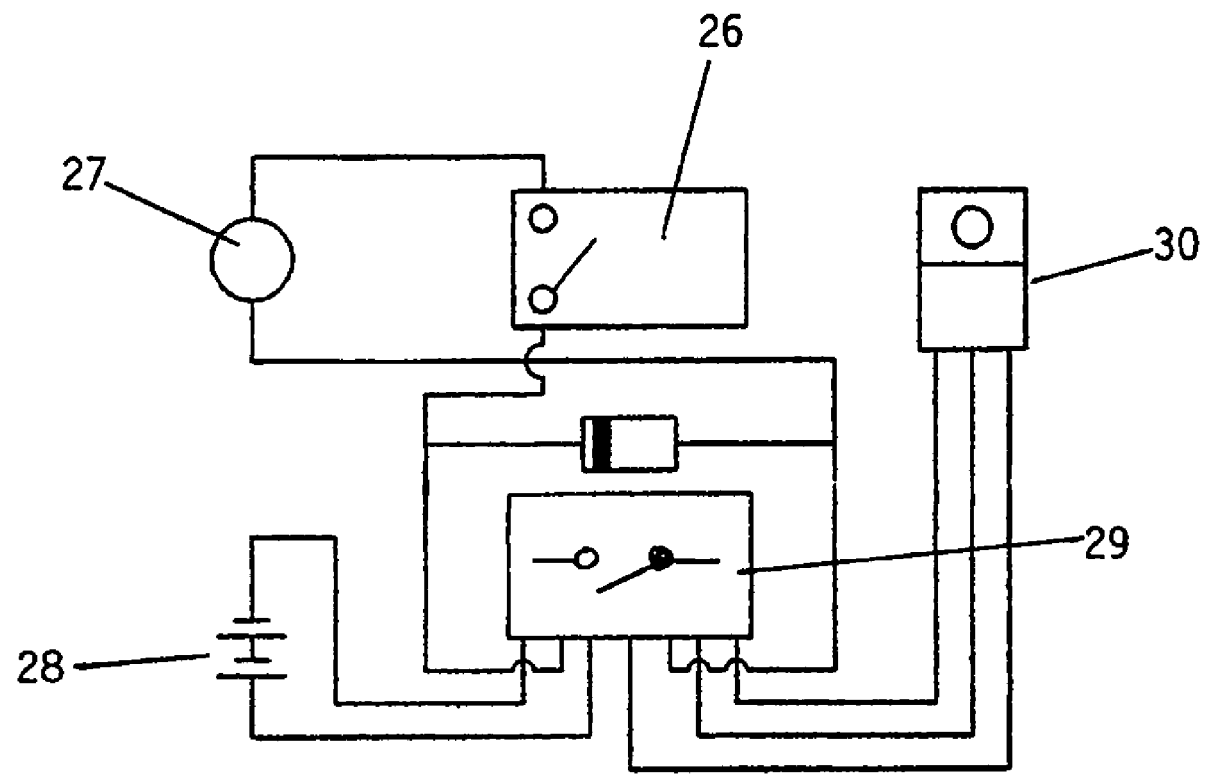
FIG. 12 is a schematic circuit diagram of electrical components of a power tool incorporating the auxiliary switch of FIGS. 3, 6 and 9.

FIG. 12 shows a control circuit diagram of the power tool in which the primary trigger switch is identified at 29. A thyristor 30 is in circuit with the primary trigger switch 29 in a known manner for controlling the operation of an electric motor 27. A battery 28 supplying power to the circuit and motor 27 cannot supply power unless the auxiliary switch 26, a single-pole single-throw switch, is closed. As seen in FIG. 12, the auxiliary switch 26 is connected in series with the primary trigger switch 29 and, therefore, both switches 26 and 29 must be closed before the motor 27 can be activated.

It should be appreciated that modifications and alterations obvious to those skilled in the art are not to be considered as beyond the scope of the present invention. For example, the auxiliary switch activator 13 need not be pivot-mounted and the contact plate 15 need not be configured to pivot upon the shaft 14. Indeed equivalent components might slide linearly.

The invention claimed is:

1. A safety device for a power tool having an electric motor and a trigger to activate the motor via a primary trigger-activated switch, comprising:
    an auxiliary switch in circuit with the motor; and
    an activator movable between a first position in which the auxiliary switch is opened by the activator and the activator prevents depression of the trigger, and a second position in which the auxiliary switch is closed by the activator and the activator allows depression of the trigger, wherein
    the activator is mounted pivotably upon a shaft, and
    the auxiliary switch comprises a conductive contact plate pivoting with the shaft and having a non-conductive region or gap, and a pair of fixed contact points bearing upon the contact plate to close the auxiliary switch, whereupon pivoting of the contact plate to align the non-conductive region or gap with one of the fixed contact points opens the auxiliary switch.

2. The safety device as claimed in claim 1, wherein the activator comprises a stopper against which the trigger abuts in the first position.

3. The safety device as claimed in claim 1, wherein
    the activator is movable to a third position in which the auxiliary switch is closed by the activator and the activator allows depression of the trigger, and
    the first position is located between the second and third positions.

4. The safety device as claimed in claim 3, further comprising a resistance pin cooperating with the activator and maintaining the activator in the first, second, or third positions, until a threshold force is applied to the activator.

5. The safety device as claimed in claim 1, further comprising a spring biasing the activator toward the first position.

* * * * *